Feb. 26, 1963  E. R. HOWARD  3,078,717
CONDITION RESPONSIVE DEVICE
Filed Feb. 11, 1959  2 Sheets-Sheet 1

Fig. 4.ª

Inventor,
Ernest R. Howard,
by Townsend M. [signature]
Atty.

Feb. 26, 1963  E. R. HOWARD  3,078,717
CONDITION RESPONSIVE DEVICE
Filed Feb. 11, 1959  2 Sheets-Sheet 2
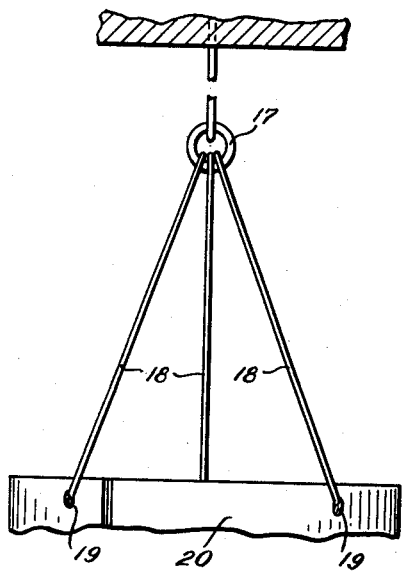
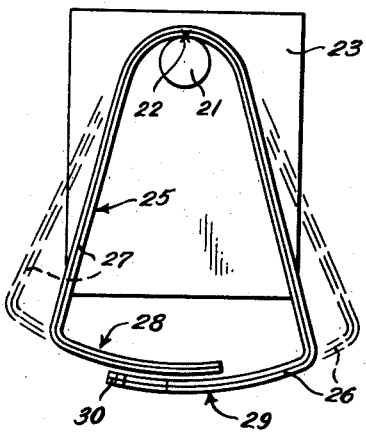
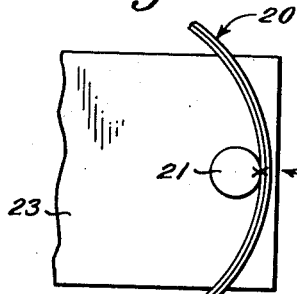
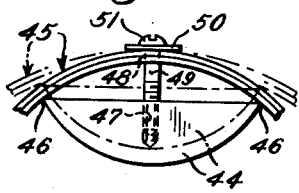
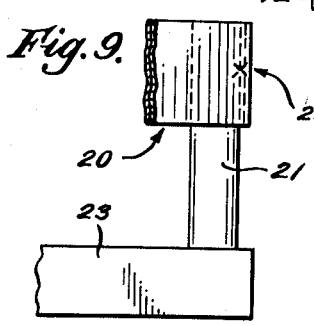
Inventor,
Ernest R. Howard,
by Townsend M. Gunn
Att'y.

United States Patent Office 3,078,717
Patented Feb. 26, 1963

3,078,717
CONDITION RESPONSIVE DEVICE
Ernest R. Howard, North Attleboro, Mass., assignor to Texas Instruments Incorporated, Dallas, Tex., a corporation of Delaware
Filed Feb. 11, 1959, Ser. No. 792,597
6 Claims. (Cl. 73—363.5)

This invention relates to condition-responsive devices, and more particularly, to temperature-indicating devices.

Prior temperature-indicating devices have generally been in the form of mercurial thermometers, or devices employing heat-sensitive paint, or devices employing bearings, linkages and/or electrical conductors.

These prior devices are relatively costly and more complex than the thermometer of the instant invention.

One object of this invention is to provide a one-piece thermometer which is simple and inexpensive to manufacture.

A further object of the instant invention is the provision of a one-piece thermometer which does not employ glass, bearings, linkages, heat-sensitive paint or electrical conductors.

Yet another object is the provision of a one-piece thermometer which is highly accurate and sensitive to thermal changes and yet is simple in construction, inexpensive to manufacture and has only one moving part which is subject to substantially no wear.

As will be more apparent from the detailed description following, the thermometer that forms the instant invention has only one moving part, has minimal wear, is simply constructed, easy and inexpensive to manufacture and requires no maintenance. In addition to obvious practical utility, the thermometer of the instant invention is ornamental and particularly useful for educational purposes to illustrate thermal expansion properties.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

FIG. 4a is a front elevational view of a thermometer illustrating another embodiment of an indicator and temperature indicia for a thermometer having the high-expansion side of the thermostat metal on the outside;

FIG. 8 is a front elevational view of one means of supporting the thermostat-metal thermometer;

FIG. 9 is a side elevational view of another embodiment of a support means for the thermometer;

FIG. 10 is a top plan view of FIG. 9;

FIG. 11 is a top plan view of yet another embodiment of the thermometer of the instant invention employing the support means illustrated in FIG. 9;

FIG. 12 is a front elevational view of a further modification of the thermometer of the instant invention;

FIG. 13 is a sectional view taken on line 13—13 of FIG. 12 illustrating a calibrated temperature indicia attachment; and FIG. 14 is a top plan view illustrating a calibration screw-type adjustment applicable to each of the species of the thermometer illustrated in the foregoing figures.

The several objects of the invention are accomplished by constructing a thermometer of a thermostat metal formed into a single enclosure with overlapping ends which are free to move in response to thermal changes and providing one of the ends with calibrated temperature indicia and the other end with an indicator.

The single-enclosure thermostat-metal thermometer can be formed in various shapes including a ring, rectangle and triangle, which shapes are merely illustrative embodiments of the instant invention, and are not intended as limiting.

The thermostat-metal thermometer of the instant invention can be suspended or mounted on a base or can be mounted in cantilever fashion to a rigid support. For thermometers of the instant invention which are relatively compact, it is desirable that they be supported free from frictional contact with surfaces that would impede motion of the thermometer in response to thermal changes. In thermometers of larger size, frictional contact with surfaces would not have any significant effect on the motion of the thermometer in response to thermal changes.

Figure 1:
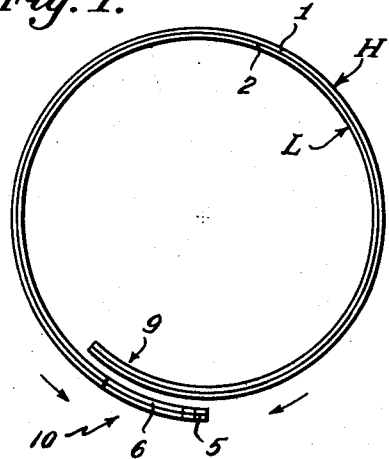
FIG. 1 is a top plan view of one form of the thermometer with the high-expansion side of thermostat metal on the outer side.
Figure 2:
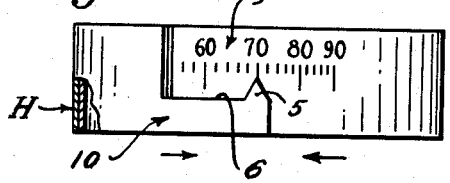
FIG. 2 is a front elevational view of the thermometer shown in FIG. 1 showing the indicator and temperature indicia.

Referring now to the drawings wherein similar reference characters indicate corresponding parts throughout several views of the drawings, FIG. 1 illustrates a ring-type thermometer comprised of thermostat metal wherein the numeral 1 represents the high-expansion side of the thermostat metal and 2 represents the low expansion side of the thermostat metal. It is preferred to employ a bimetal type of thermostat metal although other types of thermostat metal could also be employed. The ring-type thermometer illustrated in FIG. 1 is a single turn of thermostat metal forming a single enclosure and has overlapping free ends 9 and 10. The clearance between overlapping free ends 9 and 10 is just enough to permit unimpeded motion of the free ends in response to thermal changes. An outer end 10, as best seen in FIG. 2, there is provided an indicator pointer 5 and a recess 6 to make visible a calibrated temperature scale on the inner free end 9.

Figure 3:
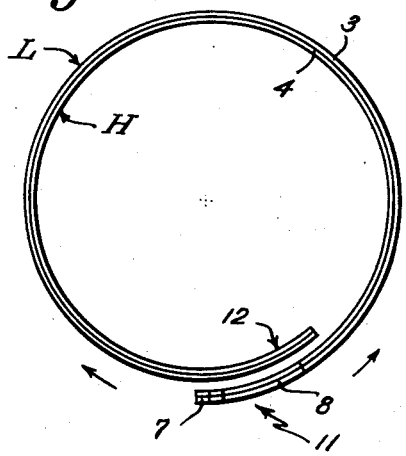
FIG. 3 is a top plan view of the thermometer shown in FIG. 1 but with the high-expansion thermostat material on the inside.

FIG. 3 illustrates a ring-type thermometer similar to FIG. 1 except that the thermometer in FIG. 3 has a high-expansion thermostat material 4 on the inside and the low-expansion material 3 on the outside. The thermometer of FIG. 3, as that of FIG. 1, has a recess 8 on outside free end 11 which makes visible a calibrated temperature scale on the inner free end 12, and an indicator pointer 7 on the outer free end 11 which overlaps inner free end 12. The calibrated temperature scale on inner free ends 9 and 12 can be stamped thereon, prepared on a decal or on some other convenient scale attachment such as, for example, shown in FIGS. 12 and 13, and inserted thereon in a proper adjusted calibrated position. Pointers 5 and 7, as illustrated respectively in FIGS. 2 and 4, are conveniently integral with free ends 10 and 11, but could also be in the form of an attachment.

The motion of the free overlapping ends of the thermostatic metal rings of FIGS. 1 and 3 described above, with respect to each other upon heating is in the direction of the arrows in FIGS. 1 and 3 and is proportional to the product of the radius of the ring and the active length of the thermostat metal or the circumference of the ring. The ring shown in FIGS. 1 and 2 having the high-expansion thermostat metal layer 1 on the outside upon heating causes free ends 9 and 10 to move toward each other, increasing the overlap therebetween and causes a reduction in the enclosure area of the ring and also in its circumference and radius with increase in temperature. The ring-shaped thermostat-metal thermometer shown in FIGS. 3 and 4 having the high-expansion thermostat-metal layer 4 on the inside, upon heating causes free ends to move away from each other decreasing the overlap therebetween and causes an increase in the enclosure area of the ring and an increase in its circumference and radius with increase in temperature. The ring-type thermometer shown in FIG. 3 which has the high-expansion thermostat metal on the inside has the inside free end 12 extending in a counterclockwise direction whereas the ring thermometer shown in FIG. 1 has the inner free end 9 extending in a clockwise direction as viewed in FIGS. 3 and 1, respectively. This enables the temperature scale for each of the ring thermometers to be calibrated with temperatures increasing from left to right.

Figure 6:
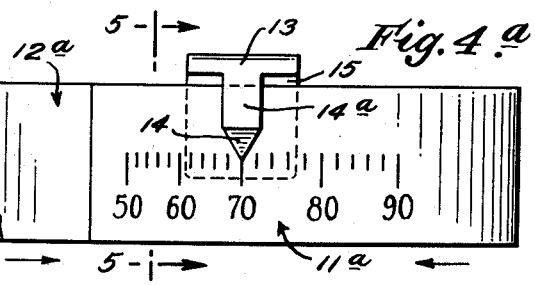
FIG. 6 is a graph illustrating the relationship between pointer movement and temperature for a thermometer having the high-expansion material of the thermostat metal on the inside in one case and on the outside of the thermometer in another case.
Figure 6:
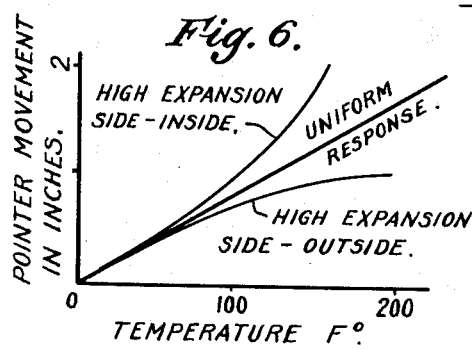

The ring thermometer of FIG. 1, which winds up on heating, has the result of gradually decreasing the active length between the pointer and the dial immediately behind it. Also, the radius of the ring decreases on heating and, therefore, the actual relative rate of motion of the pointer with respect to the scale decreases with an increase in temperature. This will be clear when reference is made to FIG. 6, which shows pointer movement with respect to temperature. The straight line in the graph of FIG. 6 represents a uniform response of pointer motion to temperature change. In this case, where the high-expansion side is on the outside of the thermometer as shown in FIG. 1, the relative rate of pointer movement gradually decreases with an increase in temperature. This factor is compensated for in the calibration for the temperature scale.

Figure 4:
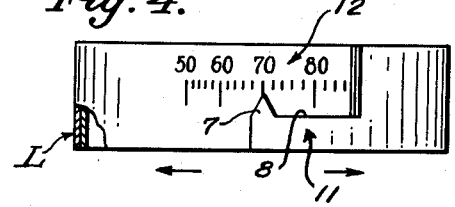
FIG. 4 is a front elevational view of the thermometer shown in FIG. 3, illustrating the indicator and calibration temperature indicia.

The ring-type thermometer shown in FIGS. 3 and 4 has the high-expansion side 4 on the inside and unwinds upon heating, with the result that the active length between the pointer and the dial immediately behind it increases gradually. Also, the radius of the ring increases on heating and, therefore, the actual relative rate of motion of the pointer with respect to the scale increases with increase in temperature. Referring again to FIG. 6 in this case, where the high-expansion side 4 is on the inside, the relative rate of pointer movement gradually increase with an increase in temperature. Here again, this factor is compensated for in the calibrated temperature scale.

Figure 7:
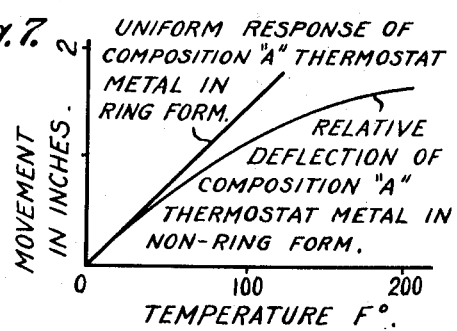
FIG. 7 is a graph illustrating the relationship between thermostat metal movement and temperature for a particular composition of thermostat metal in a ring and non-ring form.

To achieve a more uniform response between pointer movement and temperature change, a thermostat metal composition whose actual relative deflection in response to thermal change when not in ring form is on the type illustrated by the curve in FIG. 7, could be employed. This thermostat metal, when employed in a ring thermometer, would then be mounted with the high-expansion side on the inside, which would have the effect of increasing the relative rate of motion of the pointer movement in response to increase in temperature so as to more nearly approximate a uniform response, as represented by the straight line in the graph in FIG. 7.

Figure 5:
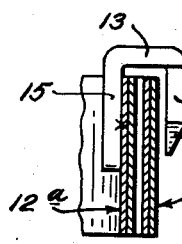
FIG. 5 is a cross-sectional view taken on line 5—5 of FIG. 4.

FIG. 4a illustrates a modification of the pointer and calibration arrangement for the ring-type thermometer illustrated in FIG. 1 which has the high-expansion side of the thermostat metal on the outside. In FIG. 4a, 12a represents the inside free end and 11a represents the outside free end. The inner free end 12a corresponds to inner free end 12 of FIG. 3 in that both inner free ends 12 and 12a extend in a counterclockwise direction. In this modification, the outside free end 11a has a calibrated temperature scale thereon such as the one on inner free ends 9 and 12 of FIGS. 1 and 3, and the inside end 12a has a pointer 14 mounted and secured thereto as best seen in FIG. 5. The pointer 14 comprises a U-shaped element having legs 14a and 15 and a bight portion 13. Leg 15 is secured to the inner face of the inner free end 12a as by riveting, bolting, welding or the like. The bight portion 13 transcends the upper edge of free ends 11a and 12a. Sufficient clearance is provided between leg 14a of the indicator and the outside face of the outside free end 11a so to permit unimpeded motion of the free end in response to thermal changes.

FIGS. 8, 9 and 10 illustrate two means of support for the thermometer thus far described. In the species of FIG. 8, the thermometer 20 is suspended by a means of a ring 17 secured to a supporting surface and flexible members 18 secured to the ring 17 and thermometer 20 by means of spaced apertures 19 formed therein. Three flexible members 18 are shown in FIG. 8, but it should be understood that more than three flexible members 18 could also be employed if desired.

In FIG. 9, thermometer 20 is supported on a base 23 by means of rod 21 which is secured to the base and can be secured to the inner or outer side of thermometer 20 as by bolting, riveting, welding or the like as at 22.

FIG. 10 is a top plan view of the arrangement described above in FIG. 9.

It can be seen that in both the species of support illustrated in FIGS. 8 and 9, the thermometer is maintained out of frictional contact with any surfaces and is unimpeded in its movement in response to thermal changes. A sufficiently large thermometer could be placed directly on a surface and the resistance to movement in response to thermal changes due to frictional contact would be relatively insignificant in comparison to the motion that would take place in response to thermal changes.

FIG. 11 is a top plan view illustrating a further modification of the single-enclosure thermostat-metal thermometer of the instant invention wherein thermometer movement in response to temperature change is illustrated by the dashed line portions. In this specie, the thermometer 25 is substantially triangular having a V-shape or U-shape, with overlapping legs 28 and 29. The term V-shaped as employed in the specification and claims is intended to mean both U-shaped and V-shaped. As in the species illustrated in FIGS. 1 and 3 for the ring-type thermometer, the thermometer 25 can have either the high-expansion side of the thermostat metal on the outside or inside of the thermometer. If the high-expansion side 27 is on the inside, the temperature calibration would then be on the innermost free end 28 and the pointer 30 would be on the outside free end 29 as seen in FIG. 11. The pointer and scale arrangement illustrated in FIGS. 4 and 4a and described above, could be employed with the U-shaped thermometer of FIG. 11, with the high-expansion side on the outside. If the high-expansion side of the thermostat metal is 26, which is on the outside, then legs 28 and 29 would be reversed and leg 29 would be the inside leg and leg 28 would be the outside leg, and the pointer 30 would then be on the "outside" leg 28 and the temperature scale on the "inside" leg 29, and the pointer-calibration arrangement illustrated in FIG. 2 would be employed. The V-shaped thermometer illustrated in FIG. 11 is supported by a base 23, such as was described above in connection with FIGS. 9 and 10.

FIG. 12 illustrates a further modification of the bimetal thermometer of the instant invention wherein thermometer movement in response to temperature change is illustrated by the dashed line portions. In this modification, the thermometer is triangular, having a V-shape or U-shape as in the species disclosed in FIG. 11. The thermometer of FIG. 12 is, however, suspended by a single flexible support 33 and is suitably secured at one end 32 to a fixed surface 31 and at its other end 32a to the thermometer as by riveting, bolting, welding or the like. The thermometer has overlapping free ends 36 and 38, corresponding to legs 28 and 29 of the thermometer in the species of FIG. 11. In the thermometer as illustrated in FIG. 12, the outside thermostat-metal layer 34 is the high-expansion metal and the inside layer 35 is the low-expansion metal. End 36 is provided with a pointer 37 which pointer can be integral with leg 36 or in the form of an attachment such as pointers 5 and 7 of the thermometers of FIGS. 1 and 3. The outside free end 38 is provided with a calibrated scale attachment 39. As shown in FIG. 13, calibrated scale attachment 39 comprises an inverse J-shaped element having parallel legs 40 and 42 and a bight portion 41. The attachment 39 has retaining frictional surfaces 43 in engagement with three sides of free end 38. The attachment is inserted on free end 38 and adjusted for the proper setting and left in place with frictional surfaces 43 maintaining the attachment in its proper location on free end 38.

In the species of FIG. 12, if 34 is the low-expansion side and the inner side 35 would be the high-expansion side, then in order to read from left to right for increasing temperature on the calibrated temperature scale, the attachment could be secured to inner free end 36 and the pointer 37 could be provided on the outer free end 38. The attachment 39 and its mounting as shown in FIG. 13 is equally applicable to a ring-type thermometer such as illustrated in FIGS. 1 and 3 which could also be suspended by a single flexible support such as 33 and fixed to a surface 31 in the same manner as the V-shaped thermometer illustrated in FIG. 12. Here again as in the species of FIG. 12, the attachment can be secured on the outer free end of a one-point suspended type ring thermometer when the high-expansion material is on the outer side, or on the inner free end of the ring thermometer when the high-expansion material is on the inside. The pointer 37 can be provided on inner free end 36 or outer free end 38, depending on whether the high-expansion material is on the outside or the inside. The above considerations as to placement of the scale attachment on the inner or outer free ends of the thermometer illustrated in FIG. 12 and for a single-point suspended-ring thermometer supported in the same manner as the thermometer of FIG. 12, are limited to thermometers which have the inner free end extending in a counterclockwise direction. It should be realized, however, that if the inner free end extends in a clockwise direction, the scale attachment would then be on the outer free end when the high-expansion side of the thermostat metal is on the inside and on the inner free end when the high-expansion side is on the outside.

FIG. 14 illustrates a calibration adjustment which is applicable to each of the thermometers illustrated in FIGS. 1, 3, 11 and 12. The calibration adjustment comprises a block element 44 having peripheral edges 46 abutting the inside of a thermometer 45. The block is located at a point remote from the movable free ends of the thermometer. For example, in the species of the thermometer illustrated in FIGS. 11 and 12, the block would preferably be located at the apex or bight portion of the V-shape and in the thermometer illustrated in the species of FIGS. 1 and 3, the block preferably would be located on the circumference of the ring at points diametrically opposite the overlapping free ends. However other locations could also be employed but the aforementioned locations are the most desirable.

The block 44 is provided with a threaded aperture 47. Thermometer 45 is provided with a screw-receiving aperture 48, through which is inserted screw 49 for threaded engagement with aperture 47. Washer 50 is interposed between the screw head 51 and thermometer 45. On those type of thermometers not provided with a sliding calibration attachment such as illustrated in FIGS. 12 and 13, the calibration adjustment means illustrated in FIG. 14 in particularly useful. The dashed line portions in FIG. 14 illustrate thermometer adjustment motion which adjustment can be effected by rotation of the screw 49 to adjust the relative position between the pointer and scale so as to accurately reflect actual temperature conditions.

The thermometer of the instant invention, in all its modifications, can be made easily and inexpensively as, for example, by cutting a piece of sheet thermostat metal to the desired developed blank and then rolling it as on a three-roll brake or forming it by other conventional methods, making sure that there is sufficient clearance between the overlapping free ends. Where it is desired to have the calibrated temperature scale stamped on the side of the thermometer, such can be done on the sheet developed blank before rolling or forming to the desired shape.

It can be seen from the above that the single-turn, single-enclosure type and the single-turn ring-type thermometers of the instant invention provide maximum utilization of the thermostat metal, provide a thermometer which is rapidly responsive to temperature change with the entire length of the thermostat metal and all surfaces thereof subjected directly to the surrounding temperature and provide maximum temperature-indicating motion in response to thermal change for a given length and thickness of thermostat metal, therefore enabling a larger and more accurate and precise calibrated temperature scale. The dimensions and proportions of certain of the parts as shown in the drawings have been modified and/or exaggerated for the purposes of clarity of disclosure.

In view of the above, it will be seen that the several objects of the invention are achieved and other advantageous results attained.

I claim:

1. A temperature indicating device comprising a member formed of thermostat material having a plurality of metal laminae having unequal coefficients of thermal expansion, said member comprising a spiral of a continuous single convolution having closely spaced, aligned and overlapping free ends; said free ends directly opposing each other and positioned for unrestricted movement relative to each other in response to thermal change; and one of said ends having pointer indicator means thereon registering with calibrated temperature indicia provided on the other of said ends, and flexible means, one end of which is directly connected to said member and the other end of which is connected to a support thereby suspending said member.

2. A temperature indicating device comprising a member formed of a strip of thermostat material having a plurality of metal laminae having unequal coefficients of thermal expansion, said member comprising a continuous, integrally formed single turn enclosure having closely spaced, aligned and overlapping free ends; said free ends directly opposing each other and positioned for unrestricted movement relative to each other in response to thermal change; and one of said ends having pointer indicator means thereon registering with calibrated temperature indicia provided on the other of said ends, and flexible means, one end of which is directly connected to said member and the other end of which is connected to a support thereby suspending said member.

3. The device as set forth in claim 2 and wherein said continuous single turn comprises a ring; the outermost one of said plurality of metal laminae having the highest coefficient of thermal expansion, the outermost overlapping free end being provided with said pointer indicator means and the inner free end being provided with said calibrated temperature indicia.

4. The device as set forth in claim 2 and wherein said continuous single turn enclosure comprises a ring.

5. The device as set forth in claim 2 and wherein said continuous single turn enclosure is substantially triangular in shape.

6. The device as set forth in claim 2 and wherein said continuous single turn enclosure is substantially V-shaped.

References Cited in the file of this patent

UNITED STATES PATENTS

| | | |
|---|---|---|
| 269,796 | Kirk et al. | Dec. 26, 1882 |
| 289,603 | Barton | Dec. 4, 1883 |
| 2,470,753 | Alban | May 24, 1949 |
| 2,674,882 | Doggett | Apr. 13, 1954 |

FOREIGN PATENTS

| | | |
|---|---|---|
| 766,323 | France | Apr. 9, 1934 |